(12) United States Patent
Moyer

(10) Patent No.: US 7,617,437 B2
(45) Date of Patent: Nov. 10, 2009

(54) ERROR CORRECTION DEVICE AND METHOD THEREOF

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 440 days.

(21) Appl. No.: 11/359,329

(22) Filed: Feb. 21, 2006

(65) Prior Publication Data

US 2007/0220354 A1 Sep. 20, 2007

(51) Int. Cl.
*G11C 29/00* (2006.01)
(52) U.S. Cl. .......................................... 714/763; 714/6
(58) Field of Classification Search .................. 714/6, 714/752, 758, 763
See application file for complete search history.

(56) References Cited

U.S. PATENT DOCUMENTS 6,119,248 A * 9/2000 Merkin ........................ 714/52

2005/0283650 A1* 12/2005 Zhang et al. .................... 714/6
2006/0143551 A1* 6/2006 Biswas et al. ............... 714/726
2008/0148124 A1* 6/2008 Zhang et al. ................ 714/752

OTHER PUBLICATIONS

PCT/US07/60659 International Search Report and Written Opinion mailed Aug. 19, 2008.

* cited by examiner

*Primary Examiner*—Scott T Baderman
*Assistant Examiner*—Sam Rizk

(57) ABSTRACT

A device for error correction includes a memory control module to disable error processing for a memory location depending on the state of a status indicator. The status indicator can be set so that error processing is disabled when valid error correction and detection information for the memory location is not available, such as after a reset or power-on event. In addition, the memory control module can promote partial write requests to full write requests when error processing is disabled to ensure that valid error detection and correction data is calculated for the memory location. By disabling error processing until valid error detection and correction information is available, the number of unnecessary or invalid error processing operations is reduced, thereby conserving device resources.

20 Claims, 4 Drawing Sheets

ERROR CORRECTION DEVICE AND METHOD THEREOF

FIELD OF THE DISCLOSURE

The present disclosure relates to error control schemes, and more particularly to error control schemes for memory.

BACKGROUND

Memory devices, such as RAM, flash memory, and hard disk drives, can contain storage errors. These errors can result from physical factors of the memory device or other factors. Memory errors can lead to erroneous data being read from the memory device, and frequent or repeated errors can result in poor device operation.

In order to reduce the impact of memory storage errors, a device can employ error correction techniques. For example, a memory device can store error correction code (ECC) data for memory locations in the memory device. The ECC data contains parity or other data that allows the device to detect errors. In addition, the ECC data can contain error correction data that allows the device to correct detected errors.

While memory error correction techniques can improve memory reliability, the techniques also consume device resources, such as power and the response time of the device. The consumption of the resources may be undesirable in some applications, such as in portable or other low-power devices.

Some devices, in order to improve memory reliability, employ a scheme wherein after a reset event (such a reset, power-on, or other event) the memory is filled with a predetermined sequence of data, and ECC data is calculated for the memory based on this predetermined sequence. However, this scheme can result in undesirable delay after a reset event, as well as undesirable consumption of power after the reset event. This power consumption may be especially undesirable in portable devices, or devices that frequently experience reset events.

Therefore, it is desirable to provide a device that performs error correction without consuming an undesirable amount of device resources.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

A device and method for error correction are disclosed. The device includes a memory control module to disable error processing for a memory location depending on the state of a status indicator. The status indicator can be set so that error processing is disabled when valid error correction and detection information for the memory location is not available, such as after a reset or power-on event. In addition, the memory control module can promote partial write requests to full write requests when error processing is disabled to ensure that valid error detection and correction data is calculated for the memory location. By disabling error processing until valid error detection and correction information is available, the number of unnecessary or invalid error processing operations is reduced, thereby conserving device resources.

Figure 1:
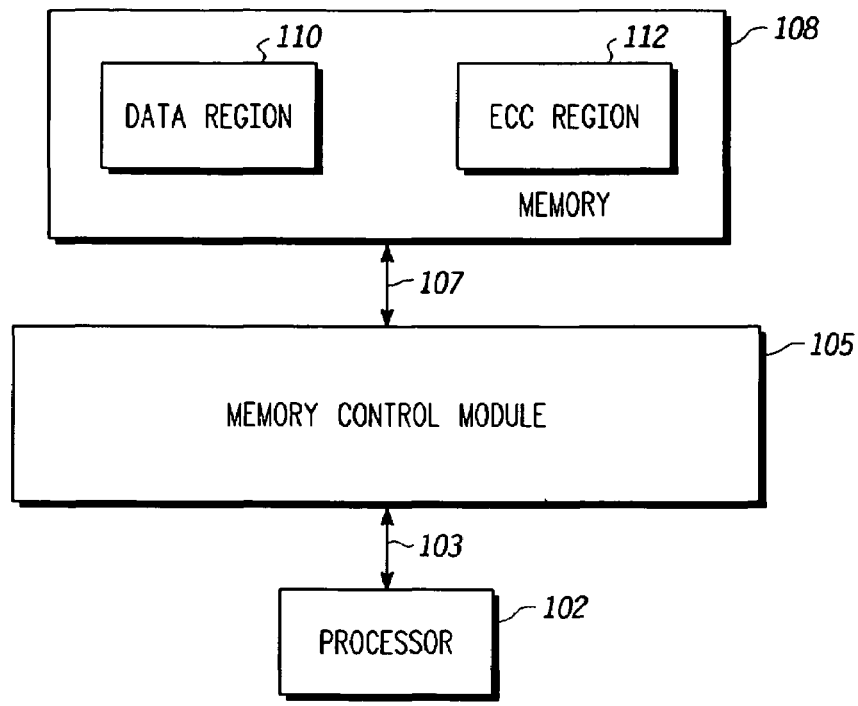
FIG. 1 is an illustration of a particular embodiment of a processing device employing an error correction scheme.

Referring to FIG. 1, processing device 100 is illustrated. The processing device 100 includes a processor 102 connected to a memory control module 105 via a first interface 103. The device 100 further includes a volatile memory 108 connected to the memory control module 105 via a second interface 107. The memory 108 includes a data region 110 and an ECC region 112. The processing device 100 can be an ASIC, a system on a chip (SOC), integrated circuit, or other device. In addition the processing device 100 can be used in a variety of applications, such as mobile or portable devices, automotive devices, or other appropriate devices. The memory 108 can be RAM memory (including DRAM or SRAM or other RAM memory) or any other type of volatile memory.

During operation, the processor 102 sends memory access requests, such as read and write requests, to the memory control module 105. The memory control module 105 determines whether error processing is enabled for the memory location associated with the memory access request, and performs the appropriate action. If error processing is enabled, the memory control module 105 performs the appropriate error processing, such as error detection and correction for a read request, or creation of parity data and syndrome data for a write request. If error processing is disabled, these functions are not performed by the memory control module 105. By performing error processing only when such processing is enabled, the device 100 can reduce unnecessary error processing, thereby saving power, time, or other device resources.

For example, after the device 100 has been reset or powered on, the data in the data region 110 of the memory 108 is indeterminate. Accordingly, any ECC data associated with the memory 108, such as parity data or syndrome data stored in the ECC region 112, typically is random data and therefore is likely to be invalid. Therefore error correction or detection operations on the memory 108 will likely return erroneous results until valid data is written to the memory 108. The memory control module 105 can reduce the number of unnecessary or invalid error processing operations by disabling at least one of error correction or error detection, until valid data has been written to the memory 108.

In the illustrated embodiment, the memory control module 105 can perform error processing on various types of memory access requests, including read requests and write requests. For example in the case of a read request, the memory control module 105 performs error detection and, if necessary, error correction if error processing is enabled on the portion of the memory 108 associated with the read request.

In the case of a write request, the request may be a full write request or a partial write request. A full write request is a request to write data to the full width of an ECC data unit (the amount of memory associated with a single ECC syndrome value), while a partial write request is a request to write data to less than the full width of an ECC data unit. For example, the memory control module 105 and the memory 108 may be configured to perform error detection and correction based on a 64-bit ECC data unit. Accordingly, in this example, a full write operation is a 64-bit write operation, while 32-bit (word), 16-bit (half-word), and 8-bit (byte) write operations are partial write operations.

In the case of a full write request, the memory control module 105 calculates error detection information, such as parity data, and error correction information, such as syndrome data, for the data associated with the write operation. The write control module 105 writes the error detection information and the error correction information, as well as the data associated with the write request, to the memory 108.

In the case of a partial write request, in order to compute the ECC data for a partial write operation when error processing is enabled, the write control module 108 or the processor 102 can transform a partial write request into a "read-modify-write operation." Under this operation, if error processing is enabled, the full data unit at the memory address associated with the partial write request is read, and error detection and error correction are performed by the memory control module 105 on the full data unit. For example, in the case of a memory configured for a 64-bit ECC data unit, all of the 64 bits of a memory location are used to calculate the ECC data. The appropriate portion of the full data unit is then replaced by the data associated with the partial write operation, and the full data unit (with the replaced data) is written to the memory 108. Updated error detection and correction values are calculated based on the updated full data unit containing the new partial write data value.

Alternatively, if error processing is disabled, the memory control module 105 can promote a partial write request to a full write request. Promoting a write request, as used herein, is defined as transforming a partial write request to a full write request. In one embodiment, an 8, 16, or 32-bit partial data write request is promoted to a 64-bit full data write request. This can be done in a variety of ways. For example, the memory control module 105 can append or insert a predetermined sequence of data to the data associated with the partial write request so that the transformed data is commensurate with a full ECC data unit. The transformed data can then be written to the memory 108. Updated error detection and correction values are calculated based on the updated full data unit containing the transformed write data value.

By promoting partial write requests to full write requests, valid error correction and detection values for the data are placed in the memory 108 for future error processing operations. Accordingly, after the partial write request has been promoted to a full write request and error correction and detection information for the full write request has been calculated and stored, error correction for the memory location associated with the write request can be enabled, and error processing can be performed for subsequent memory access requests associated with the memory location.

In addition, by promoting partial write requests to full write requests, together with selectively enabling error processing operations, the memory control module 105 can conserve system resources. For example, as explained, after a device reset or power-on event, the data in the memory 108 is indeterminate and error processing on the memory 108 will likely result in errors for read and write accesses, especially in the case of partial write operations, because those operations involve both a read function and a write function. Furthermore, because each memory location is filled with known data when either a full write or a promoted partial write operation is performed on the memory location, the memory 108 need not be pre-filled or initialized with a known sequence of data directly after a reset or power-on event, thereby saving time and power.

Figure 2:
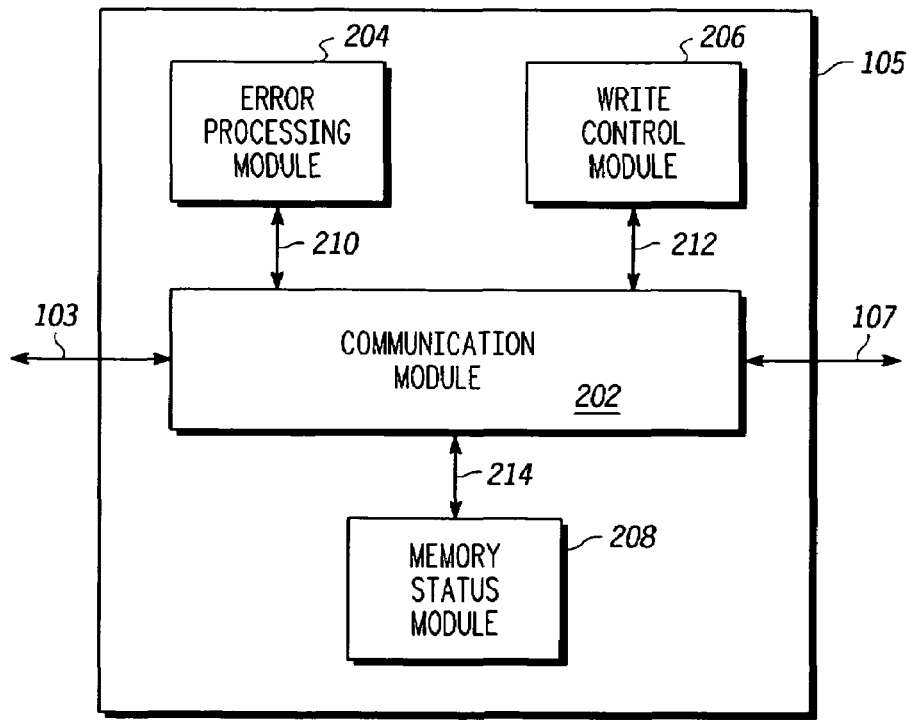
FIG. 2 is an illustration of a particular embodiment of the memory control module of FIG. 1.

Referring to FIG. 2, a particular embodiment of the memory control module 105 of FIG. 1 is depicted. As illustrated, the memory control module 105 includes a communication module 202 connected to the first interface 103 and the second interface 107. In addition, the communication module 202 is connected to an error processing module 204 via a third interface 210, to a write control module 206 via a fourth interface 212, and to a memory status module 208 via a fifth interface 214. The modules 202, 204, 206, and 208 may be implemented as hardware, software, firmware, or any combination thereof. To illustrate, some or all of the modules 202, 204, and 206 may be implemented as logic to perform their corresponding functions.

During operation, the memory control module 105 performs error processing and memory access request processing. To perform error processing, the communication module 202 receives a memory access request from a processor via the first interface 103. The memory access request typically includes a memory address of the memory location associated with the request and, in the case of a write request, payload data to be written to the memory. The communication module 202 provides the memory address to the memory status module 208, which determines whether error processing is enabled for the particular memory location associated with the memory address.

If error processing is disabled for the particular memory location associated with the memory access request, the memory status module 208 indicates to the error processing module 204, via the communication module 202, that error processing should not be performed with respect to the memory access request. The memory access request is then communicated by the communication module 202 to the memory 108 (FIG. 1) via the second interface 107.

If error processing is enabled for the particular memory location associated with the memory access request, the memory status module 208 indicates to the error processing module 204 that error processing should proceed. In response, the error processing module 204 performs the appropriate error processing, utilizing data from the data region 110 and ECC information from the ECC region 112 of memory 108. For example, in the case of a read request, the error processing module 204 detects errors in the data read from the memory 108 and, if necessary, corrects the errors to produce error-corrected read data. In the case of a write request, the error processing module 204 calculates ECC data, such as parity and syndrome data, based on the payload data associated with the write request.

After the error processing is completed, the communication module 202 communicates with the processor 102 (FIG. 1) and the memory 108 to complete the memory access request. For example, in the case of a read request, the communication module 202 communicates the error-corrected read data to the processor. In the case of a write request, the communication module 202 communicates the payload data and the ECC data calculated by the error processing module 204 to the memory 108.

By selectively enabling error processing, the memory control module 105 can reduce the amount of unnecessary or undesirable error processing. For example, error processing can be disabled by the processor in order to improve the response time for memory access requests. This may be desirable for critical device operations that require rapid memory response. In another embodiment, error processing can be disabled in order to reduce power consumption. For example, the device incorporating the memory control module 105 may include a low power state, where frequent error control operations are undesirable because of the associated power consumption.

In addition, in a particular embodiment, the memory control module 105 can control error processing so that such processing is enabled for certain portions of a memory and disabled for other portions. This may be useful in a variety of situations. For example, the memory control module 105 can be configured so that error processing is enabled for portions of a memory that include critical device data, but disabled for portions of the memory that store less critical data. In another embodiment, error correction may be enabled for portions of the memory that have experienced frequent errors, or are operating under unfavorable operating conditions, while error processing is disabled for other portions of the memory that have experienced fewer operating errors. In another embodiment, error correction may be enabled for portions of the memory whose contents have been initialized since a power-on event has occurred, while error processing is disabled for other portions of the memory that have not yet been initialized.

Further, the memory status module 208 may change the error processing status for a memory location over time. For example, error processing may be disabled for a particular memory location until a write request has been fulfilled for that memory location, and valid ECC data has been calculated for that memory location. Thus, the memory control module 105 can dynamically change the error processing configuration for a memory depending on the appropriate circumstances.

In another particular embodiment, the memory status module 208 can receive a reset indication from the processor 102 via the communication module 202. In response to the reset indication, the memory status module 208 can disable error processing for all or a portion of the memory locations. This can reduce the amount of invalid or unnecessary error processing after a system reset, power-on, or other reset event.

In addition to error processing, the memory control module 105 performs write request processing. The communication module 202 receives a write request from the processor via the first interface 103. The communication module 202 provides the address data or the payload data associated with the write request to the write control module 206, which determines whether the write request is a full write request or a partial write request. This can be done in a variety of ways. For example, the write control module can make the determination based on a comparison of the size of the payload data to the size of the ECC data unit for the memory 108. In another embodiment, the determination can be based on the address associated with the memory access request. Alternate embodiments may make the determination in any other relevant manner.

If the write request is a full write request, the write control module 206 indicates to the communication module 202 that the full write request may be processed, and the payload data (together with ECC data, if such data has been calculated) may be written to the memory.

If the write request is a partial write request, the write control module 206 consults the memory status module 208 to determine whether error processing is enabled for the memory location associated with the request. If error processing is enabled, the write control module 206 can perform a read-modify-write operation to fulfill the partial write request, without promoting the partial write request. The partial write data values are merged with error-corrected read data obtained from the read operation of the read-modify-write operation during the "modify" operation, and the memory location is subsequently updated with the modified value during the write portion of the read-modify-write operation. Updated ECC data calculated from the modified data value is also stored. If error processing is disabled, the write control module 206 promotes the partial write request to a full write request. The write control module 206 can then provide the resulting full write request to the error processing module for ECC data calculation, and provide the data associated with the resulting full write request to the communication module 202 for communication to the memory.

By selectively promoting partial write requests to full write requests, the write control module 206 can ensure that valid or known data is written to a particular memory location for all types of write requests. The memory status module 208 can then enable error correction for that memory location.

Figure 3:
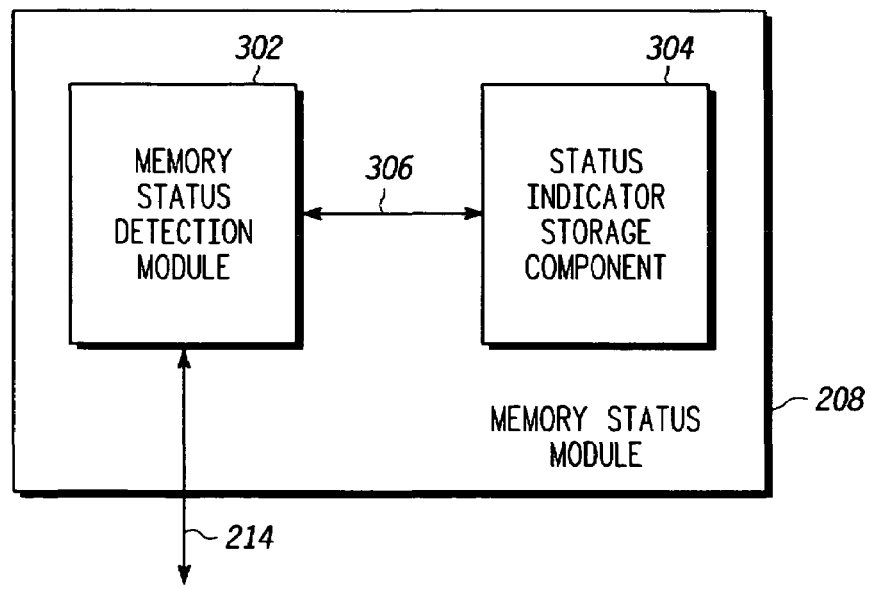
FIG. 3 is an illustration of a particular embodiment of the memory status module of FIG. 2.

Referring to FIG. 3, a particular embodiment of the memory status module 208 of FIG. 2 is illustrated. The memory status module 208 includes a memory status detection module 302 connected to the interface 214 and connected to a status indicator storage component 304 via an interface 306. The status indicator storage component 304 includes one or more status indicators associated with corresponding memory locations. The status indicator storage component 304 may be a data file, a status register, a series of status flag bits, or other appropriate status indicator. The modules 302, and 304, may be implemented as hardware, software, firmware, or any combination thereof. To illustrate, one or both of the modules 302 and 304 may be implemented as logic to perform their corresponding functions.

During operation, the memory status detection module 302 receives memory status inquiries via the interface 214. The memory status inquiries include an indication of a memory location associated with the inquiry, such as memory address or an indication based on a memory address. In response to an inquiry, the memory status detection module 302 accesses the status indicator storage component 304 to determine whether error processing is enabled for the memory location. The memory status detection module can then return a response to the inquiry indicating whether error processing is enabled or disabled.

In addition, the memory status detection module 302 can receive memory status change requests via the interface 214. Similar to the memory status inquiries, the memory status change requests can include a memory location indicator. In response to the memory status change request, the memory status detection module 302 can access status indicator storage component 304 to change the error processing status of one or more memory locations. For example, if the status indicator storage component 304 includes a status flag bit associated with a memory location, the memory status detection module can set or clear the bit, as appropriate, to enable or disable error processing for that memory location.

In addition, a memory status change request may also be associated with more than one memory location. Accordingly, in response to a memory status change request, the memory status detection module 302 can enable or disable error processing for a region of memory or for an entire memory device.

Figure 4:
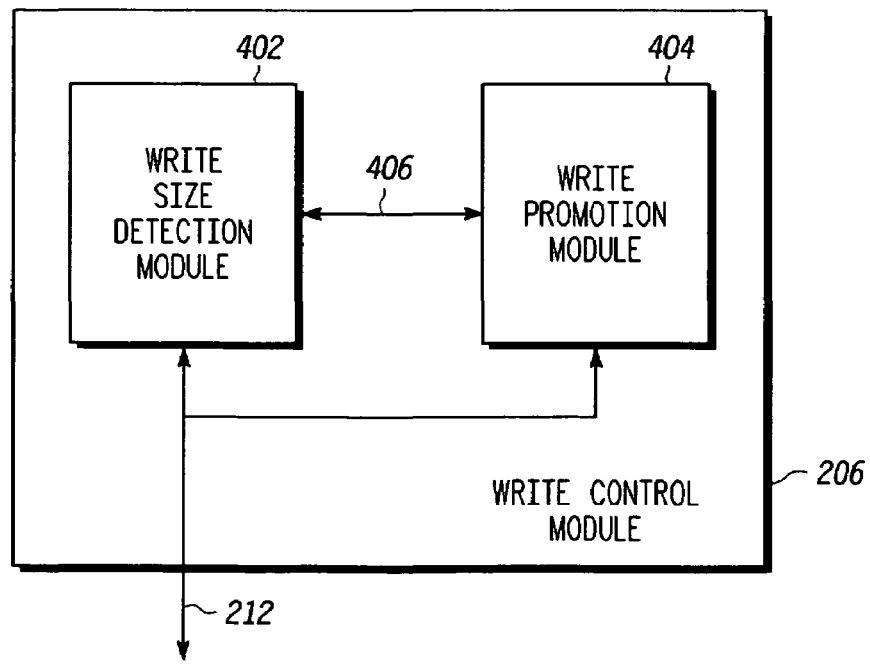
FIG. 4 is an illustration of a particular embodiment of the write control module of FIG. 2.

Referring to FIG. 4, a particular embodiment of the write control module 206 of FIG. 2 is illustrated. The write control module includes a write size detection module 402 connected via an interface 406 to a write promotion module 404. The write size detection module 402 and the write promotion module 404 are each connected to the interface 212. The modules 402 and 404 may be implemented as hardware, software, firmware, or any combination thereof. To illustrate, some or all of the modules 402 and 404 may be implemented as logic to perform their corresponding functions.

During operation, the write size detection module 402 receives write requests via the interface 212. The write size detection module 402 determines whether a received write request is a full or partial write request. If the write request is a partial write request, the write size detection module 402 instructs the write promotion module 404 to promote the write request to a full write operation. In response, the write promotion module 404 receives the payload data associated with the partial write operation via the interface 212. The write promotion module 404 then promotes the partial write operation to a full write operation, and returns the resulting payload data via the interface 212.

Figure 5:
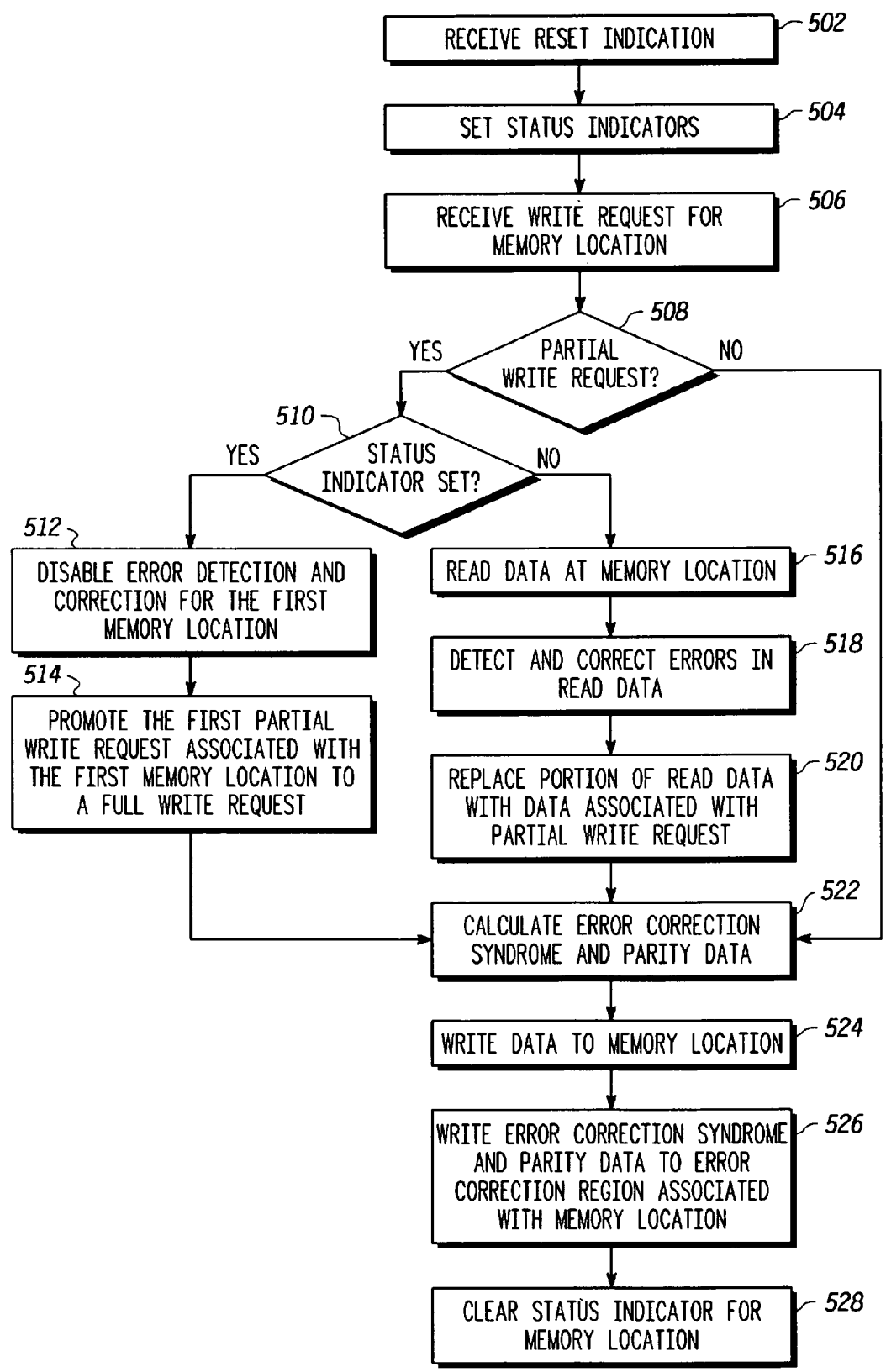
FIG. 5 is a flow chart of a method of processing a memory write access request.

Referring to FIG. 5, a flow chart of a particular embodiment of a method of processing a write request for a memory is illustrated. At block 502, a reset indication is received by a processor or memory control module. The reset indication may be received after a variety of events, such as a power-on event, a transition of a device from a low-power state to an active state, a reset event, or other appropriate event.

Proceeding to block 504, a plurality of status indicators are set by the processor or memory control module. These status indicators can be associated with a plurality of memory locations, and indicate that error processing for the memory locations should be disabled. By disabling error processing for the memory locations after the reset indication, unnecessary or undesirable error processing may be reduced.

Moving to block 506, a write request for a particular memory location is received at the memory control module or processor. The write request may include an address for the memory location, and data to be written to the memory location.

At decision block 508, it is determined by the processor or memory control module whether the received write request is a partial or full write request. If the request is a full write request, the method moves to block 522 and the processor or memory control module calculates error correction syndrome and parity data for the write request. Typically, the error correction syndrome and parity data are based on the data associated with the write request. The method then proceeds to block 524 and the data associated with the write request is written to the appropriate memory location. In addition, at block 526, the calculated error correction syndrome and parity data are written to an error correction region associated with the memory location. The error correction data may be written to the same memory device as the write request data or to a different device. The method then proceeds to block 528 and the status indicator associated with the memory location is cleared. This enables error correction for subsequent write operations to the memory location.

Returning to decision block 508, if the write request is a partial write request, the method proceeds to decision block 510 and the processor or memory control module determines whether the status indicator for the memory location associated with the write request is set. If the status indicator is set, indicating that error processing should be disabled, the method moves to block 512 and the processor or memory control module disables error detection and correction for the memory location. The method moves to block 514, and the processor or memory control module promotes the partial write request to a full write request. By promoting the partial write request to a full write request, valid error processing data may be calculated for the associated memory location, permitting valid error processing for future memory access requests. The method proceeds to block 522, and error correction data is calculated for the full write request that resulted from the promotion of the partial write request.

Returning to block 510, if it is determined that the status indicator is not set, indicating that error processing is enabled, the method moves to block 516 to begin a read-modify-write operation. The data at the memory location associated with the write request is read at block 516. At block 518, errors in the read data are detected and corrected if necessary. At block 520, the appropriate portion of the read data is replaced by the data associated with the partial write request. The method moves to block 522 to calculate error correction syndrome and parity data for the data resulting from the read-modify-write operation. From block 522, the method proceeds with block 524, performing the previously described operations.

Figure 6:
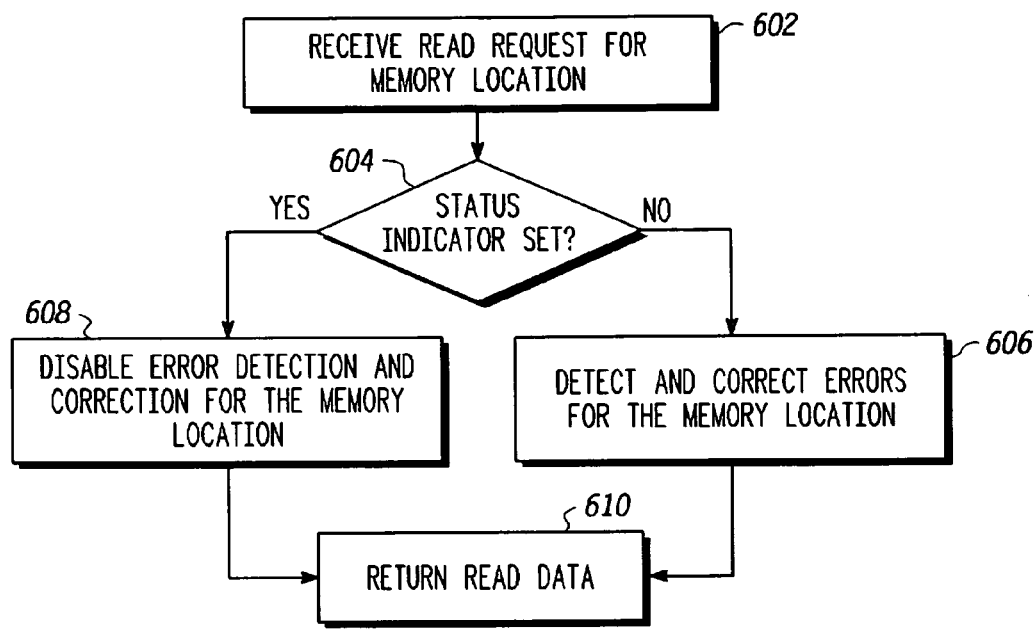
FIG. 6 is a flow chart of a method of processing a memory read access request.

Referring to FIG. 6, a flowchart of a particular embodiment of a method of processing a read request is illustrated. At block 602, a read request for a memory location is received at a processor or memory control module. The read request may include an address associated with the memory location, as well as an indication of whether the read request is a partial read request or full read request. The memory location data is then obtained.

Moving to decision block 604, the processor or memory control module determines whether a status indicator associated with the memory location is set. The status indicator is used to determine whether error processing for the memory location should be enabled.

If it is determined that the status indicator is not set, the method moves to block 606, and error detection and correction are performed. The error detection may be based on parity data associated with the memory location, and error correction may be performed using error syndrome data associated with the memory location, or error detection and correction may be performed in any other alternate manner. The method proceeds to block 610 and the error corrected data is returned to the device that made the read request.

Returning to decision block 606, if it is determined the status indicator is not set for the memory location, the method moves to block 608, and error detection and correction for the memory location is disabled. The method moves to block 610 and the read data is returned to the requesting device.

One of skill in the art will appreciate that the set state of the status indicators discussed with respect to FIGS. 5 and 6 are not limited to any particular stored value. For example, any value, including a logic "1" or "0" may be used to indicate a set state without departing from the scope of the present disclosure.

Figure 7:
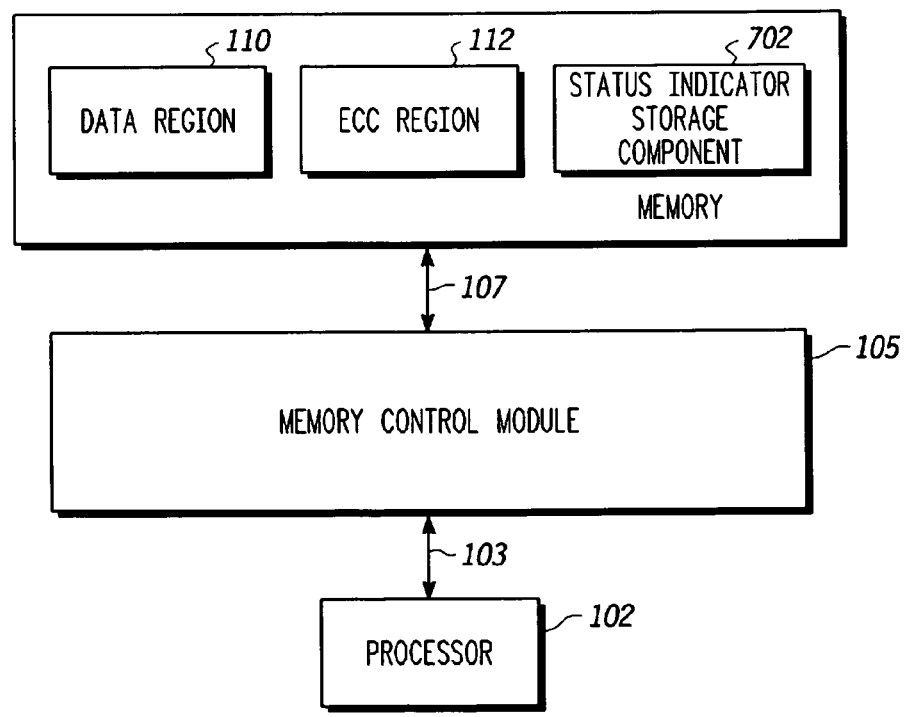
FIG. 7 is an illustration of an alternative embodiment of the processing device of FIG. 1.

Referring to FIG. 7, an alternative embodiment of the device 100 of FIG. 1 is illustrated. As illustrated, the memory 108 illustrated in FIG. 7 includes a status indicator storage component 702. The status indicator storage component 702 includes a plurality of status indicators to indicate whether error processing should be enabled or disabled for corresponding memory locations in the data region 110 of the memory 108. The status indicator storage component 702 can be accessed by the memory control module to determine whether to enable or disable error processing for a memory access request received from the processor 102.

Accordingly, as illustrated in FIG. 5, the status indicators used to enable or disable error processing for the memory 108 can be stored in the memory itself, rather than in the memory control module 105.

As explained, devices and methods for error correction are disclosed herein. One of the methods includes determining the status of a first error correction status indicator associated with the first memory location and, in response to determining that the first error correction status indicator is in a first condition, disabling one of error correction, error detection or any combination thereof for access request to the first memory location.

In a particular aspect, the method includes, in response to determining that the error correction status indicator is in a second state, enabling at least one of error detection or error correction for the access request to the first memory location.

In another particular aspect the access request is a partial write operation, and the method further comprises promoting the partial write operation to a full write operation. In still another particular aspect, the method includes calculating error correction information for the first full write operation. In another particular aspect, the method includes changing the first error correction status indicator to a second condition after promoting the first partial write operation.

In a particular aspect, the first access request is a partial write operation and the method includes, in response to determining that the error correction status indicator is in a second condition, performing error correction or error detection for the first memory location and performing the first partial write operation by writing data to a portion of the first memory location.

In another particular aspect, the method includes receiving a reset indication and placing the error correction status indicator in the first condition responsive to receiving the reset indication. In yet another particular aspect, the first memory location is incorporated in a first device, and wherein the reset indication is received in response to the device transitioning from a low power mode to an active mode.

In a particular aspect, the method includes receiving a second access request associated with a second memory location, determining the status of a second error correction status indicator associated with the second memory location, and, in response to determining that the second error correction status indicator is in a first condition, disabling error correction, error detection, or any combination thereof for access request to the second memory location.

In another particular aspect, the first full write operation is performed on a full width of an error correction data unit associated with the first memory location.

A disclosed device includes a memory including a first memory location. The first memory location includes a data region and an error correction region. The device further includes a first status indicator associated with the first memory location, an error correction module coupled to the memory. The error correction module to perform error correction associated with the first memory location. The device also includes an access control module including a first input coupled to the first status indicator and an output coupled to the error correction module. The access control module, in response to the first status indicator being in a first state, causes disabling of one of error correction, error detection, or any combination thereof for the first memory location.

In a particular aspect, in response to the first status indicator being in the first state, the access control module promotes a first partial write operation associated with the first memory location to a full write operation.

In another particular aspect, the access control module further comprises a second input to receive a reset signal, and wherein the access control module causes the first status indicator to be placed into the first state in response to receiving the reset signal.

In still another particular aspect, the error correction module calculates error correction data associated with the full write operation.

In a particular aspect, the first status indicator is a status flag bit associated with the first memory location.

Another disclosed method includes determining the status of a first error correction status indicator associated with the first memory location, and in response to determining that the error correction status indicator is in a first condition promoting the first partial write operation associated with the first memory location to a first full write operation.

In a particular aspect, the method includes disabling at least one of error detection or error correction during processing of the first partial write operation.

In another particular aspect, the method includes receiving a reset indication and placing the error correction status indicator in the first condition responsive to receiving the reset indication.

In yet another particular aspect, the method includes calculating error correction information for the first full write operation.

In a particular aspect, the method includes changing the first error correction status indicator to a second condition in addition to promoting the first partial write operation.

While the principles of the invention have been described above in connection with specific apparatus, it is to be clearly understood that this description is made only by way of example and not as a limitation on the scope of the invention.

What is claimed is:

1. A method:
   determining a condition of a first error correction status indicator associated with a first memory location; and
   in response to determining that the first error correction status indicator is in a first condition, disabling error processing for a first access request to the first memory location, wherein error processing is selected from a group consisting of error detection and error correction, wherein disabling comprises responding to the first access request without performing error processing.

2. The method of claim 1, further comprising:
   in response to determining that the first error correction status indicator is in a second condition, enabling error processing for the first access request to the first memory location.

3. The method of claim 1, wherein the first access request is a partial write operation requesting data of a first size to be written, and further comprising:
   promoting the partial write operation to a full write operation in response to determining the first error correction status indicator is in the first condition, the full write operation requesting data of a second size to be written.

4. The method of claim 3, further comprising:
   calculating error correction information for the full write operation.

5. The method of claim 3, wherein the second size is a full width of an error correction data unit associated with the first memory location.

6. The method of claim 3, further comprising:
   changing the first error correction status indicator to a second condition after promoting the partial write operation.

7. The method of claim 1, wherein the first access request is a partial write operation and further comprising:
   in response to determining that the first error correction status indicator is in a second condition:
     performing error correction or error detection for the first memory location; and
     performing the partial write operation by writing data to a portion of the first memory location.

8. The method of claim 1, further comprising:
receiving a reset indication; and
placing the first error correction status indicator in the first condition responsive to receiving the reset indication.

9. The method of claim 8, wherein the first memory location is incorporated in a device, and wherein the reset indication is received in response to the device transitioning from a low power mode to an active mode.

10. The method of claim 1, further comprising:
receiving a second access request to a second memory location;
determining the status of a second error correction status indicator associated with the second memory location;
in response to determining that the second error correction status indicator is in the first condition, disabling error processing for the second access request to the second memory location.

11. A device, comprising:
a memory including a memory location, the memory location comprising:
a data region, and
an error correction region;
a status indicator associated with the memory location;
an error correction module coupled to the memory, the error correction module to perform error correction associated with the memory location; and
an access control module comprising a first input coupled to the status indicator and an output coupled to the error correction module, the access control module to, in response to the status indicator being in a predetermined condition, disable error processing for the memory location, wherein error processing is selected from a group consisting of error detection and error correction.

12. The device of claim 11, wherein, in response to the status indicator being in the predetermined condition, the access control module promotes a partial write operation associated with the memory location to a full write operation.

13. The device of claim 12, wherein the error correction module calculates error correction data associated with the full write operation.

14. The device of claim 11, wherein the access control module further comprises a second input to receive a reset signal, and wherein the access control module causes the status indicator to be placed into the predetermined condition in response to receiving the reset signal.

15. The device of claim 11, wherein the status indicator is a status flag bit associated with the memory location.

16. A method, comprising:
receiving a partial write operation to a memory location;
determining a status of an error correction status indicator associated with the memory location; and
in response to determining that the error correction status indicator is in a first condition, promoting the partial write operation to a flail write operation.

17. The method of claim 16, further comprising:
disabling at least one of error detection or error correction during processing of the partial write operation.

18. The method of claim 16, further comprising:
receiving a reset indication;
placing the error correction status indicator in the first condition responsive to receiving the reset indication.

19. The method of claim 16, further comprising:
calculating error correction information for the full write operation.

20. The method of claim 16, further comprising:
changing the error correction status indicator to a second condition in addition to promoting the partial write operation.

* * * * *

UNITED STATES PATENT AND TRADEMARK OFFICE
CERTIFICATE OF CORRECTION

PATENT NO.         : 7,617,437 B2                                    Page 1 of 1
APPLICATION NO.    : 11/359329
DATED              : November 10, 2009
INVENTOR(S)        : William C. Moyer It is certified that error appears in the above-identified patent and that said Letters Patent is hereby corrected as shown below:

Column 12, Line 19, please change "a flail write" to --a full write--

Signed and Sealed this

Twenty-ninth Day of December, 2009

David J. Kappos
*Director of the United States Patent and Trademark Office*